United States Patent
Tollison et al.

(10) Patent No.: US 10,126,119 B2
(45) Date of Patent: Nov. 13, 2018

(54) METHODS OF FORMING A PASSIVE STRAIN INDICATOR ON A PREEXISTING COMPONENT

(71) Applicant: General Electric Company, Schenectady, NY (US)

(72) Inventors: Brian Lee Tollison, Honea Path, SC (US); Srikanth Chandrudu Kottilingam, Greenville, SC (US); Yan Cui, Greer, SC (US); Bryan Joseph Germann, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/407,595

(22) Filed: Jan. 17, 2017

(65) Prior Publication Data

US 2018/0202799 A1 Jul. 19, 2018

(51) Int. Cl.
*G01B 11/16* (2006.01)
*G01M 15/14* (2006.01)

(52) U.S. Cl.
CPC .......... *G01B 11/165* (2013.01); *G01M 15/14* (2013.01)

(58) Field of Classification Search
None
See application file for complete search history.

(56) References Cited

U.S. PATENT DOCUMENTS

| 4,528,856 | A | 7/1985 | Junker et al. |
| 4,746,858 | A | 5/1988 | Metala et al. |
| 4,782,705 | A | 11/1988 | Hoffmann et al. |
| 4,859,062 | A | 8/1989 | Thurn et al. |
| 6,078,396 | A | 6/2000 | Manzouri |
| 6,175,644 | B1 | 1/2001 | Scola et al. |

(Continued)

FOREIGN PATENT DOCUMENTS

| CN | 2014-02124 Y | 2/2010 |
| JP | H07-219266 A | 8/1995 |

(Continued)

OTHER PUBLICATIONS

Extended European Search Report and Opinion issued in connection with corresponding EP Application No. 18151397.9 dated Mar. 27, 2018.

*Primary Examiner* — Shawn Decenzo
(74) *Attorney, Agent, or Firm* — Dority & Manning, P.A.

(57) ABSTRACT

A method of forming a passive strain indicator on a preexisting component includes directly depositing a plurality of fiducial markers on a portion of the outer surface of the preexisting component, the fiducial markers including a material that is compatible with the material of the outer surface. A method of evaluating a component includes initially scanning a plurality of fiducial markers on a portion of an outer surface of the component, subjecting the component to at least one duty cycle, subsequently scanning the plurality of fiducial markers after the at least one duty cycle, measuring a displacement of the plurality of fiducial markers by comparing the subsequent scan to the initial scan, and determining a remaining usable life of the component by looking up in a database a predetermined value of the remaining usable life of the component corresponding to the measured displacement of the plurality of fiducial markers.

15 Claims, 7 Drawing Sheets

(56) References Cited

U.S. PATENT DOCUMENTS

| | | |
|---|---|---|
| 6,574,363 B1 | 6/2003 | Classen et al. |
| 6,983,659 B2 | 1/2006 | Soechting et al. |
| 6,986,287 B1 | 1/2006 | Dorfman |
| 7,200,259 B1 | 4/2007 | Gold et al. |
| 7,227,648 B2 | 6/2007 | Weinhold |
| 7,414,732 B2 | 8/2008 | Maidhof et al. |
| 7,421,370 B2 | 9/2008 | Jain et al. |
| 7,441,464 B2 | 10/2008 | Turnbull et al. |
| 7,477,995 B2 | 1/2009 | Hovis et al. |
| 7,490,522 B2 | 2/2009 | Ruehrig et al. |
| 7,533,818 B2 | 5/2009 | Hovis et al. |
| 7,689,003 B2 | 3/2010 | Shannon et al. |
| 7,697,966 B2 | 4/2010 | Monfre et al. |
| 7,849,752 B2 | 12/2010 | Gregory et al. |
| 8,245,578 B2 | 8/2012 | Ranson et al. |
| 8,307,315 B2 | 11/2012 | Ranson |
| 8,511,182 B2 | 8/2013 | Bjerge et al. |
| 8,600,147 B2 | 12/2013 | Iliopoulos et al. |
| 8,818,078 B2 | 8/2014 | Telfer et al. |
| 8,994,845 B2 | 3/2015 | Mankowski |
| 9,128,063 B2 | 9/2015 | Dooley |
| 9,200,889 B2 | 12/2015 | Swiergiel et al. |
| 9,207,154 B2 | 12/2015 | Harding et al. |
| 9,311,566 B2 | 4/2016 | Iliopoulos et al. |
| 9,316,571 B2 | 4/2016 | Müller et al. |
| 9,494,490 B2 * | 11/2016 | Tralshawala ............ F01D 17/04 |
| 2005/0040147 A1 * | 2/2005 | Hoebel ................ B23K 26/032 |
| | | 219/121.64 |
| 2013/0013224 A1 | 6/2013 | Ito et al. |
| 2013/0194567 A1 * | 8/2013 | Wan ....................... G01B 11/14 |
| | | 356/152.1 |
| 2013/0202192 A1 * | 8/2013 | Telfer .................... G06T 7/0004 |
| | | 382/154 |
| 2014/0000380 A1 | 1/2014 | Slowik et al. |
| 2014/0267677 A1 | 9/2014 | Ward, Jr. et al. |
| 2015/0239043 A1 | 8/2015 | Shipper, Jr. et al. |
| 2016/0161242 A1 | 6/2016 | Cook et al. |
| 2016/0313114 A1 | 10/2016 | Tohme et al. |
| 2016/0354174 A1 | 12/2016 | Demir |

FOREIGN PATENT DOCUMENTS

| | | |
|---|---|---|
| JP | 2002-090118 A | 3/2002 |
| WO | WO 2014/031957 | 2/2014 |

\* cited by examiner

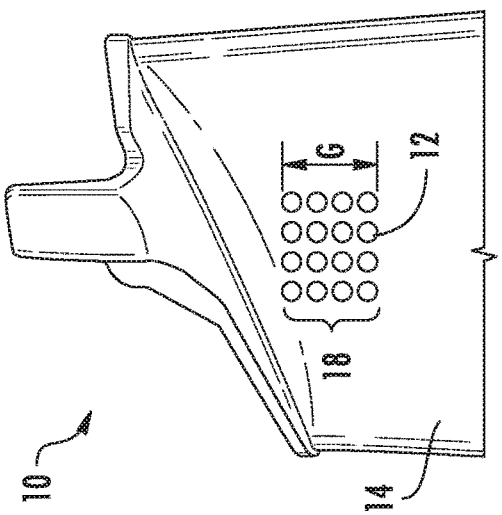
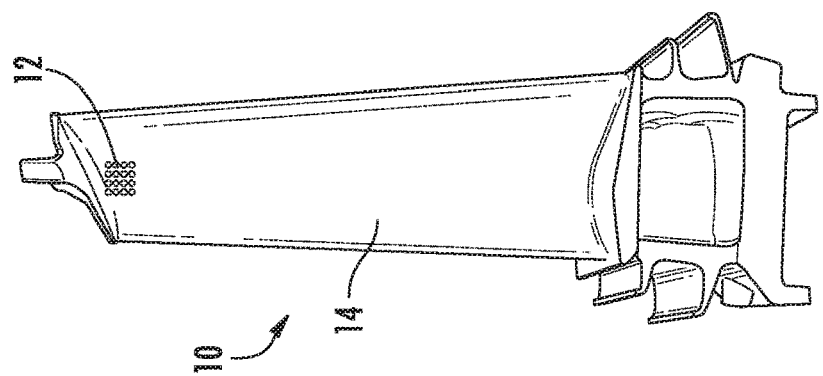
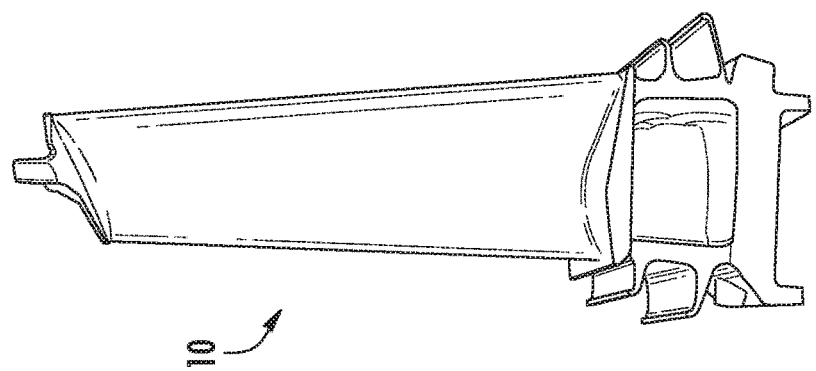

```
                    ┌─────────────────────────────────────────┐
                    │ DIRECT A FLOW OF A CARRIER FLUID TOWARDS A FIRST │
                    │ LOCATION ON THE OUTER SURFACE OF A PREEXISTING  │──210
                    │ COMPONENT, THE FLOW OF CARRIER FLUID CARRYING A │
                    │ POWDER, THE POWDER COMPRISING A MATERIAL THAT IS│
                    │ COMPATIBLE WITH THE MATERIAL OF THE OUTER SURFACE│
                    └─────────────────────┬───────────────────┘
                                          ▼
                    ┌─────────────────────────────────────────┐
                    │     EMIT LIGHT IN THE FORM OF LASER BEAMS       │──220
                    │            FROM A LASER SOURCE                  │
                    └─────────────────────┬───────────────────┘
                                          ▼
                    ┌─────────────────────────────────────────┐
                    │  DIRECT THE EMITTED LASER BEAMS TOWARDS THE FIRST│
                    │  LOCATION ON THE OUTER SURFACE OF THE COMPONENT TO│──230
                    │  MELT THE POWDER CARRIED IN THE FLOW OF THE CARRIER│
                    │  FLUID ONTO THE OUTER SURFACE OF THE COMPONENT AT│
                    │              THE FIRST LOCATION                 │
                    └─────────────────────┬───────────────────┘
                                          ▼
                    ┌─────────────────────────────────────────┐
                    │ DIRECT THE FLOW OF CARRIER FLUID TOWARDS A SECOND LOCATION│──240
                    │ ON THE OUTER SURFACE OF THE PREEXISTING COMPONENT│
                    └─────────────────────┬───────────────────┘
                                          ▼
                    ┌─────────────────────────────────────────┐
                    │ DIRECT THE EMITTED LASER BEAMS TOWARDS THE SECOND│──250
                    │ LOCATION ON THE OUTER SURFACE OF THE PREEXISTING COMPONENT TO│
                    │ MELT THE POWDER CARRIED IN THE FLOW OF THE CARRIER│
                    │ FLUID ONTO THE OUTER SURFACE OF THE COMPONENT AT THE│
                    │              THE SECOND LOCATION                │
                    └─────────────────────────────────────────┘
```

FIG. 11

METHODS OF FORMING A PASSIVE STRAIN INDICATOR ON A PREEXISTING COMPONENT

FIELD

The present disclosure relates generally to methods for monitoring component strain, and methods for forming a passive strain indicator on a preexisting component.

BACKGROUND

Throughout various industrial applications, apparatus components are subjected to numerous extreme conditions (e.g., high temperatures, high pressures, large stress loads, etc.). Over time, an apparatus's individual components may suffer creep and/or deformation that may reduce the component's usable life. Such concerns might apply, for instance, to some turbomachines.

Turbomachines are widely utilized in fields such as power generation and aircraft engines. For example, a conventional gas turbine system includes a compressor section, a combustor section, and at least one turbine section. The compressor section is configured to compress a working fluid (e.g., air) as the working fluid flows through the compressor section. The compressor section supplies a high pressure compressed working fluid to the combustors where the high pressure working fluid is mixed with a fuel and burned in a combustion chamber to generate combustion gases having a high temperature and pressure. The combustion gases flow along a hot gas path into the turbine section. The turbine section utilizes the combustion gases by extracting energy therefrom to produce work. For example, expansion of the combustion gases in the turbine section may rotate a shaft to power the compressor, an electrical generator, and other various loads.

During operation of a turbomachine, various components within the turbomachine and particularly components along the hot gas path such as turbine blades within the turbine section of the turbomachine, may be subject to creep due to high temperatures and stresses. For turbine blades, creep may cause portions of or the entire blade to elongate so that the blade tips contact a stationary structure, for example a turbine casing, and potentially cause unwanted vibrations and/or reduced performance during operation.

BRIEF DESCRIPTION

Aspects and advantages of the invention will be set forth in part in the following description, or may be obvious from the description, or may be learned through practice of the invention.

In accordance with one embodiment of the present disclosure, a method of forming a passive strain indicator on a preexisting component is provided. The preexisting component includes an outer surface including a first material. The method includes directly depositing a plurality of fiducial markers on a portion of the outer surface of the preexisting component, the fiducial markers including a second material that is compatible with the first material. The portion of the outer surface includes an analysis region on the outer surface of the component. The analysis region defines a gage length, and each fiducial marker of the plurality of fiducial markers has a maximum diameter of between one-tenth and one-twentieth of the gage length.

In accordance with another embodiment of the present disclosure, a component is provided. The component includes an outer surface including a first material and a plurality of fiducial markers on a portion of the outer surface. The fiducial markers include a second material that is compatible with the first material, the portion of the outer surface includes an analysis region on the outer surface of the component, the analysis region defines a gage length, and each fiducial marker of the plurality of fiducial markers has a maximum diameter of between one-tenth and one-twentieth of the gage length.

In accordance with yet another embodiment of the present disclosure, a method of evaluating a component is provided. The method includes initially scanning a plurality of fiducial markers on a portion of an outer surface of the component, subjecting the component to at least one duty cycle, subsequently scanning the plurality of fiducial markers after the at least one duty cycle, measuring a displacement of the plurality of fiducial markers by comparing the subsequent scan to the initial scan, and determining a remaining usable life of the component by looking up in a database a predetermined value of the remaining usable life of the component corresponding to the measured displacement of the plurality of fiducial markers.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of an exemplary preexisting component prior to forming a passive strain indicator thereon;

FIG. 2 is a perspective view of the component of FIG. 1 after a passive strain indicator been formed thereon in accordance with embodiments of the present disclosure;

FIG. 3 is an enlarged perspective view of the component and the passive strain indicator of FIG. 2;

FIG. 11 is a flow chart illustrating a method of forming a passive strain indicator on a preexisting component in accordance with embodiments of the present disclosure.

DETAILED DESCRIPTION

Figure 4:
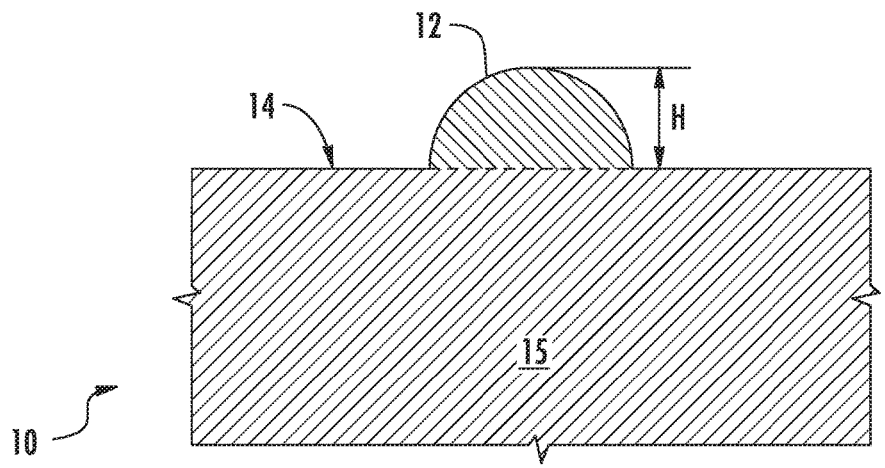
FIG. 4 is a partial section view of the component of FIG. 2 including a fiducial marker formed thereon in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring to FIGS. 1 and 2, an exemplary component 10 is illustrated with a plurality of fiducial markers 12 (FIG. 2) formed on the component's outer surface 14. The component 10 can be any of a variety of types of components used in a variety of different applications, such as, for example, components utilized in high temperature applications (e.g., components including nickel or cobalt based superalloys). In some embodiments, the component 10 may be an industrial gas turbine or steam turbine component such as a combustion component or hot gas path component. In some embodiments, the component 10 may be a turbine blade, compressor blade, vane, nozzle, shroud, rotor, transition piece or casing. In other embodiments, the component 10 may be any other component of a turbine such as any other component for a gas turbine, steam turbine or the like. In some embodiments, the component may be a non-turbine component including, but not limited to, automotive components (e.g., cars, trucks, etc.), aerospace components (e.g., airplanes, helicopters, space shuttles, aluminum parts, etc.), locomotive or rail components (e.g., trains, train tracks, etc.), structural, infrastructure or civil engineering components (e.g., bridges, buildings, construction equipment, etc.), and/or power plant or chemical processing components (e.g., pipes used in high temperature applications).

Figure 7:
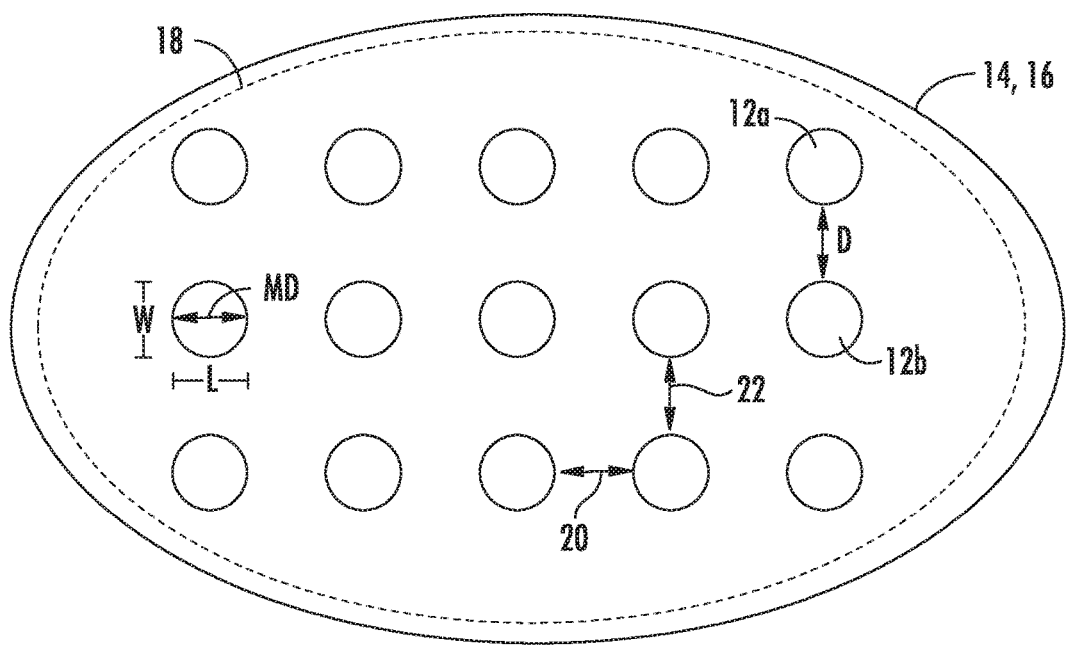
FIG. 7 is an overhead view of a plurality of fiducial markers in accordance with embodiments of the present disclosure.

As illustrated for example in FIG. 2, the exemplary component 10 has an outer surface 14 on which the fiducial markers 12 are positioned. The example component 10 shown in the illustrative embodiment of FIGS. 1 and 2 is a turbine component, more specifically, a turbine blade. However, the component 10 can be various additional or alternative components, as described above. The fiducial markers 12 are generally identifiable targets having a length L and width W (see FIG. 7) across the outer surface 14. Certain fiducial marker 12 embodiments may further include a thickness relative to the outer surface 14, thereby forming an elevated marker surface having a height H (see FIG. 4) above the outer surface 14.

As illustrated for example in FIG. 4, the exemplary component 10 has an interior volume 15. Interior volume 15 and outer surface 14 may be formed from a first material. Various cooling passages (not shown) may be defined in the interior volume 15. In some embodiments, such as when the component 10 is a turbine blade, suitable materials for the interior volume 15 may include high performance nickel-based superalloys such as GTD-111, GTD-141, GTD-444, R108, INCONEL™ 738, or single crystal N4 and N5. Alternatively, the turbine blade 10 may be formed from other suitable metal or other materials. The fiducial markers 12 may each be advantageously formed from a material, e.g., a second material, which is compatible with (and in some cases, identical to) the first material. For example, where the first material of the component 10 is a metal, such as a nickel-based superalloy, the fiducial markers 12 may include a second material which is compatible in that it is similar with respect to properties which may be life-limiting within the use environment of the component 10, such as corrosion resistance and coefficient of thermal expansion. In some exemplary embodiments, the component 10 may be a hot gas path component of a gas turbine. In such embodiments, the use environment of the component 10 (in this example, the hot gas path of a gas turbine) includes high temperatures to which the component 10 and any fiducial markers 12 formed thereon may be exposed, such that suitable compatible materials for the fiducial markers 12 would include materials with a similar coefficient of thermal expansion as the first material.

Figure 5:
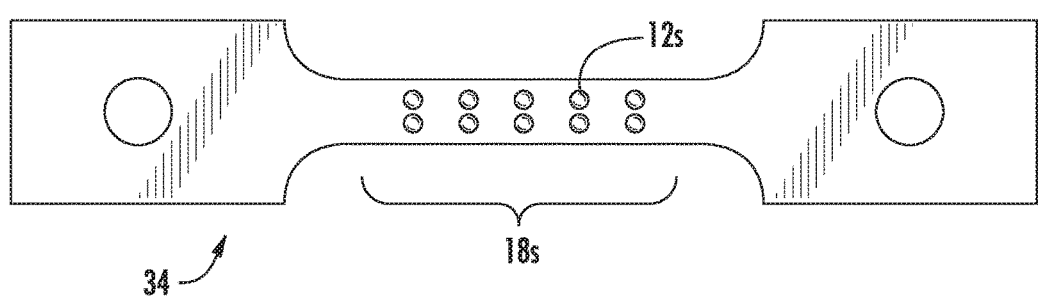
FIG. 5 is a perspective view of a sample piece with a plurality of fiducial markers formed thereon in accordance with embodiments of the present disclosure.
Figure 6:
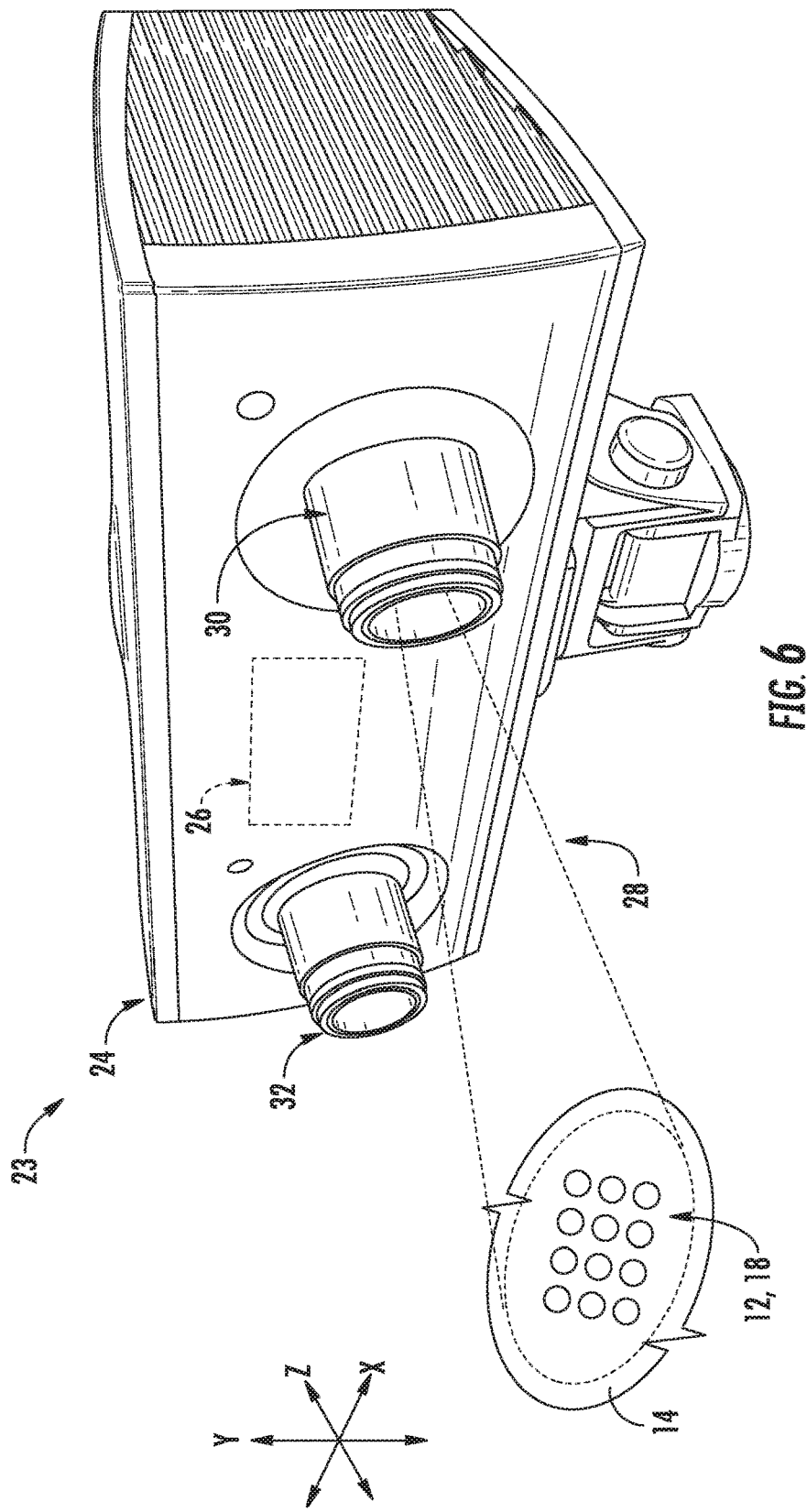
FIG. 6 is a perspective view of a system for monitoring component strain in accordance with embodiments of the present disclosure.

Referring now to FIGS. 2 through 4 and 6 through 8, the fiducial markers 12 are positioned on a portion 18 of the outer surface 14 of the component 10. In FIG. 5, the plurality of fiducial markers 12 are formed on a sample piece 34, as will be discussed in more detail below. In exemplary embodiments, at least two discrete markers (e.g., 12a and 12b) are provided, such that a distance D can be measured between said at least two markers 12a and 12b. As should be appreciated to those skilled in the art, these measurements can help determine the amount of strain, strain rate, creep, fatigue, stress, etc. at that region of the component 10. The at least two discrete markers 12a and 12b can be disposed at a variety of distances and in a variety of locations depending on the specific component 10 so long as the distance D therebetween can be measured. Optionally, the fiducial markers 12 may be positioned in a predetermined reference pattern 18. For example, the fiducial markers 12 may be arranged as matrix grid across a defined portion of the exterior surface 14 of the component 10, as illustrated in FIG. 6. The matrix grid may include a preselected column spacing 20 and a preselected row spacing 22 to define the distance D between each adjacent marker 12. Moreover, multiple components, or portions of components, may include individualized predetermined reference patterns 18. In other words, the predetermined reference pattern 18 of one component 10 or portion may be distinguishable and different from the predetermined reference pattern 18 of another component 10 or portion. This may allow discrete components and/or portions to be identified and tracked throughout the life of the component 10.

The fiducial markers 12 may have any suitable shapes, such as dots, lines, circles, rectangles or any other geometrical or non-geometrical shape, so long as they are consistently identifiable and may be used to measure the distance D therebetween. The fiducial markers 12 may form a variety of different configurations and cross-sections such as by incorporating a variety of differently shaped, sized, and positioned fiducial markers 12. For instance, each fiducial marker 12 may include a matched or unique shape. In some embodiments, each marker 12 may define a circular shape, rectangular shape, or linear shape that is the same as (i.e., matched) or unique from another fiducial marker.

FIG. 5 illustrates an example test piece or sample piece 34 as may be used in various embodiments. The sample piece 34 may have a plurality of sample fiducial markers 12s formed thereon. The sample fiducial markers 12s on the sample piece may have generally the same shape and configuration as fiducial markers 12 on component 10. The sample piece 34 may be composed of the same material as the component 10, and the plurality of sample fiducial markers 12s on the sample piece 34 may be composed of the same material as the plurality of fiducial markers 12 on the component 10. In other embodiments, the material(s) of sample piece 34 and/or sample fiducial markers 12s may be similar but not the same as the corresponding materials of component 10 and/or fiducial markers 12. For example, where mechanical strain is being tested, materials with similar mechanical properties may be used for the sample piece 34 and/or sample fiducial markers 12s. Also, in embodiments including a component 10 with fiducial markers 12 positioned in a predetermined reference pattern thereon, the sample piece 34 may have sample fiducial markers 12s positioned in the same predetermined reference pattern as the fiducial markers 12 on the component 10.

The example test piece 34 illustrated in FIG. 5 is sometimes known as a dog bone sample, e.g., having a relatively thin sample analysis region 18s provided in the middle of the sample piece 34 and comparatively larger end portions for engagement with a creep strain test rig. Such dog bone samples and creep strain test rigs are generally understood by those of skill in the art and are not described in further detail herein. The sample piece 34 may be used to develop a database of strain data. Such database may be empirically developed by, for example, testing the sample piece 34 in a creep strain test rig at progressive strain levels and back-calculating the strength or remaining useful life. For example, a lookup table may be developed and stored in a computer memory containing deformation or displacement data derived from scanning or otherwise measuring the plurality of sample fiducial markers 12s of sample piece 34. The table may also include a value for the remaining useful life which corresponds to each displacement data point.

In various embodiments, the database developed from testing sample piece 34, e.g., including a lookup table, may be used to evaluate a component 10. For example, an initial scan of the component 10 taken at a first time prior to placing the component 10 in service and subjecting the component 10 to at least one duty cycle may be compared to a subsequent scan of the component 10 taken at a second time, after subjecting the component 10 to at least one duty cycle. Such comparison may be used to measure or determine the displacement of the plurality of fiducial markers 12 on the component 10. The determined displacement may then be compared to data from testing the sample piece 34, e.g., by looking up the determined displacement in a lookup table, to evaluate the component 10. For example, evaluating the component 10 may include determining the remaining usable life of the component 10. As noted above, in some embodiments, the database may contain displacement values derived from testing sample piece 34 and corresponding predetermined values of the strength or remaining usable life of the component 10 for each displacement value. Thus, the remaining usable life of the component 10 may be determined by looking up a predetermined value of the remaining usable life of the component 10 in the database, the predetermined value corresponding to the measured displacement of the plurality of fiducial markers 12.

The fiducial markers 12 may be directly deposited on a portion of the outer surface 14 of component 10 by various exemplary methods. The component 10 is a preexisting component, e.g., the component 10 was formed separately from the fiducial markers 12 and prior to directly depositing the plurality of fiducial markers 12. For instance, in some embodiments, the markers 12 may be directly deposited on the outer surface 14 of the component 10 by additive methods such as laser cladding, electro-spark deposition, spot welding, metal inert gas welding, stick welding, powder-bed printing, or any other suitable additive method. In at least one embodiment, the plurality of fiducial markers 12 may advantageously be applied by laser cladding. An exemplary laser cladding process includes directing a flow of a carrier fluid towards a location, e.g., a point, on an outer surface 14 of the component 10. The carrier fluid may be an inert gas, e.g., nitrogen, argon, helium, carbon dioxide, or mixtures thereof. The flow of carrier fluid carries a powder material, e.g., a powdered metal material. A laser beam from a laser source may be directed towards the location on the outer surface 14 of the component 10 to melt the powder in the flow of the carrier fluid onto the outer surface 14 of the component 10 at the location, which may be a first location. In some embodiments, melting the powder onto the outer surface 14 may form a fiducial marker 12 at the first location, and the fiducial marker may be a first fiducial marker out of a plurality of fiducial markers 12. Thus, the process may generally be reiterated to form a second fiducial marker 12 at a second location, as well as further fiducial markers 12 (e.g., a third, fourth, etc.) at further locations as desired. In some embodiments, the first location and the second location may be spaced apart such that bare portions of the outer surface 14 remain between and around the first fiducial marker and the second fiducial marker after forming the fiducial makers on the outer surface 14. Laser cladding techniques such as the foregoing example may permit formation of fiducial markers 12 which are relatively small and close together, which may be advantageous for components such as a gas turbine component in that the effect of the plurality of fiducial markers on the aerothermal characteristics of the component may be minimized. Additionally, laser cladding techniques may be suitable for retrofitting preexisting components 10, which may advantageously be performed while the preexisting component 10 is in a service position when a line of sight is available.

As a result of such direct deposition, e.g., by laser cladding, the fiducial markers 12 are integrally joined with the outer surface 14 of the component 10, so as to reduce or minimize movements of the fiducial markers 12 independent or in excess of the component 10. Accordingly, the fiducial markers 12 in accordance with the present disclosure form an integral passive strain indicator of the component 10. Further, the direct application of fiducial markers 12 on the component 10 may increase durability and reduce the risk that suitable measurement devices will be unable to measure the markers 12 over time.

In some embodiments, the portion of the outer surface 14 on which the fiducial markers 12 are formed may define an analysis region 18 (FIG. 3) on the outer surface 14 of the component 10. In such embodiments, the major dimension of the analysis region 18 defines a gage length G of the analysis region 18. In some embodiments which include an analysis region 18 having a gage length G, the fiducial markers 12 may each have a maximum diameter MD (FIG. 7), and the maximum diameter MD of each fiducial marker 12 may be between one-eighth and one-twenty fifth, such as between one-tenth and one-twentieth, of the gage length G. In various embodiments, the gage length G of the analysis region 18 may be between two-tenths of an inch (0.2") and one and two-tenths inches (1.2"), such as between three-tenths of an inch (0.3") and one inch (1.0"). In various exemplary embodiments, the maximum diameter MD of the markers 12 may be between one hundredth of an inch (0.01") and fifteen hundredths of an inch (0.15"), such as between two hundredths of an inch (0.02") and twelve hundredths of an inch (0.12"). In some exemplary embodiments, the gage length G may be three tenths of an inch (0.3"), and the maximum diameter MD of the markers 12 may be between fifteen thousandths of an inch (0.015") and three hundredths of an inch (0.03"). It should be understood that the maximum diameter MD of one fiducial marker 12 may differ from that of other fiducial markers 12, e.g., the maximum diameters MD may all be within the same range but not necessarily equal to one another.

As noted above, in some embodiments fiducial marker 12 may have a height H (see FIG. 4) above the outer surface 14. Also as noted above, in certain exemplary embodiments, the component 10 may be a turbine blade or other suitable aerodynamic component. Advantageously, the size of the fiducial markers 12, and the height H in particular, is preferably small enough not to impact the aerodynamics of the component, while also being large enough to measure, as discussed herein. Accordingly, in such exemplary embodiments, the height H of the fiducial markers 12 may be between one thousandth of an inch (0.001") and thirty thousandths of an inch (0.030"), such as between three thousandths of an inch (0.003") and twenty-five thousandths of an inch (0.025"), such as between six thousandths of an inch (0.006") and twenty thousandths of an inch (0.020"), such as between eight thousandths of an inch (0.008") and fifteen thousandths of an inch (0.015").

As discussed in more detail below, various embodiments include directly measuring the plurality of fiducial markers 12 using a three-dimensional data acquisition device, such as with an optical scanner 24 (FIG. 6). The optical scanner 24 or other suitable device may, in some embodiments, have a field of view, i.e., a maximum areal extent that the device can capture in a single image or pass. In such embodiments, the gage length G of the analysis region 18 may preferably be at least one-third (⅓) of the field of view longest dimension, e.g., when the field of view is elliptical, the major axis of the ellipse defined by the field of view. For example, as will be discussed in more detail below, in some example embodiments, the optical scanner 24 may be a structured light scanner, and an exemplary embodiment of such scanners may have a sixty millimeter (60 mm) field of view. In such embodiments, the gage length G of the analysis region 18 may be at least twenty millimeters (20 mm). Further, in such embodiments, the field of view of scanner 24 or other suitable device may provide an upper limit on the size of analysis region 18, e.g., analysis region 18 may be sized such that all of the plurality of fiducial markers 12 can fit within the field of view.

The fiducial markers 12 may be positioned in one or more of a variety of locations on various components. For example, as discussed above, the fiducial markers 12 may be positioned on a turbine blade, vane, nozzle, shroud, rotor, transition piece or casing. In such embodiments, the fiducial markers 12 may be configured in one or more locations known to experience various forces during unit operation such as on or proximate airfoils, platforms, tips or any other suitable location. Moreover, the fiducial markers 12 may be deposited in one or more locations known to experience elevated temperatures. For example the fiducial markers 12 may be positioned in a hot gas path and/or on a combustion component 10. In some embodiments, the analysis region may include a life-limiting region of the component, e.g., a high stress or high creep region and/or a region with close tolerances or clearances. For example, in embodiments wherein the component 10 is a turbine blade of a gas turbine engine, there may be a close clearance between the turbine blade and a casing of the turbine at or near an outer portion of the blade. As such the outer portion of the blade may be life-limiting in that deformation of that portion could potentially cause the casing to interfere with rotation of the blade. Also, as noted above with respect to the height H, the size of the fiducial markers 12 is preferably small enough not to impact the aerodynamics of the component 10, in particular when the component 10 is a component of a turbomachine such as a rotary component. Accordingly, the area of the analysis region 18 may be relatively small compared to the total area of the outer surface 14. For example, in some embodiments, the area of the analysis region 18 may be less than about ten percent (10%) of the area of the outer surface 14, such as less than about eight percent (8%) of the area of the outer surface 14, such as less than about two and a half percent (2.5%) of the area of the outer surface 14.

The plurality of fiducial markers 12 may be disposed on outer surface 14 of the component 10 in any suitable number and arrangement. For example, providing at least four fiducial markers 12 may advantageously permit a 2D strain field measurement and analysis, and providing at least seven fiducial markers 12 may advantageously permit a 3D strain field measurement and analysis. The fiducial markers 12 may in various exemplary embodiments be arranged along a regular grid, e.g., such that the markers 12 define a rectangular shape. In at least one alternative embodiment, the fiducial markers 12 may be arranged in a linear fashion or other regular pattern. In other alternative embodiments, the fiducial markers 12 may be arranged in a non-linear pattern and/or may define an irregular shape. In some embodiments, as mentioned above, the fiducial markers 12 may be arranged as matrix grid, the matrix grid having preselected column spacing 20 and preselected row spacing 22, across the analysis region 18. Further, such embodiments may include relatively small preselected column spacing and/or preselected row spacing as compared to the size of the fiducial markers 12, e.g., when the component 10 is a turbine component and fiducial markers 12 are deposited thereon by laser cladding. For example, the one of the preselected row spacing 20 or the preselected column 22 spacing may be less than about seventy-five percent (75%) of the maximum diameter MD, such as less than about sixty percent (60%) of the maximum diameter MD. Various combinations of such embodiments are possible, e.g., four markers may be provided and arranged to form a rectangle or a straight line, or four fiducial markers may be provided in a non-linear pattern. Such examples are for illustration purposes only and not limitation. Any suitable number and arrangement of fiducial markers 12 may be provided in various embodiments.

It is possible in various embodiments to measure distances between and/or define locations of the fiducial markers based any of several points thereon, for example a point on an edge or outer surface of the fiducial marker, such as an apex, may be used. In some embodiments, the fiducial marker may be or approximate a portion of a sphere, such as a hemisphere, e.g., each fiducial marker of the plurality of fiducial markers may partially define a spherical surface. In such embodiments, a centroid 120 (FIGS. 9 and 10) or center of mass of the fiducial marker 12 may be used to define the location of the fiducial marker 12 for purposes of analysis. In some such embodiments, the centroid 120 of the fiducial marker 12 for analysis purposes may be the actual centroid defined by the physical geometry of the, e.g., hemispherical, fiducial marker. In other exemplary embodiments, an image processor 26 may calculate or derive a centroid 120 of a complete sphere from the partial, e.g., half, sphere defined by the fiducial marker 12. That is, the centroid of the fiducial marker for analysis purposes in some exemplary methods of monitoring as set forth herein may be a virtual centroid, e.g., the centroid of a sphere, where the fiducial marker defines a portion of the sphere.

A centroid in accordance with the present disclosure is a geometric center of a region, which may be a two-dimensional or three-dimensional region, and is thus the arithmetic mean or average position of all points in the shape. In exemplary embodiments, a centroid may be located through use of the imaging device 24 and processor 26. Processor 26, in analyzing an image of, for example, a fiducial marker, may calculate and thus locate the centroid of the fiducial marker, which may be a physical centroid or a virtual centroid, as discussed above.

Figure 9:
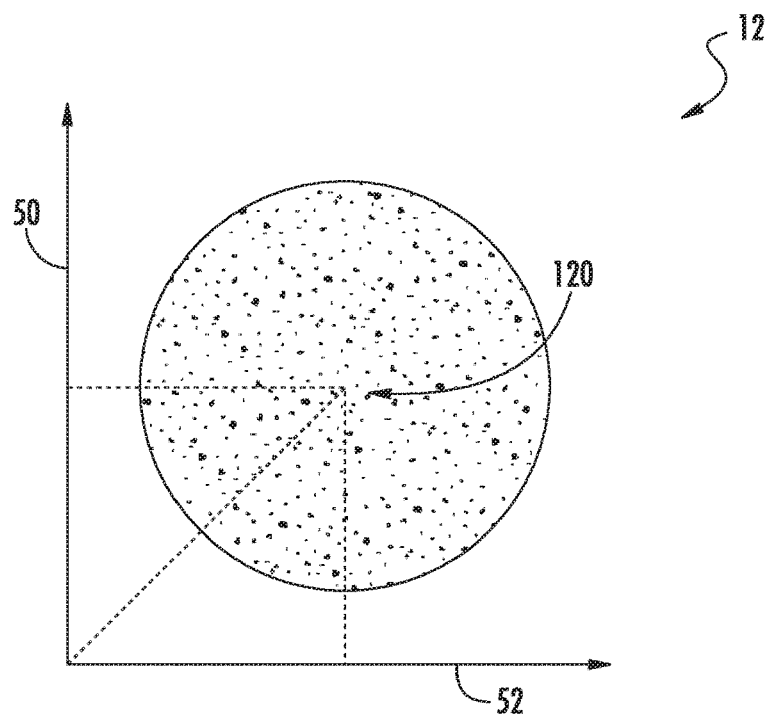
FIG. 9 is a section view of an exemplary fiducial marker at a first time in accordance with embodiments of the present disclosure.
Figure 10:
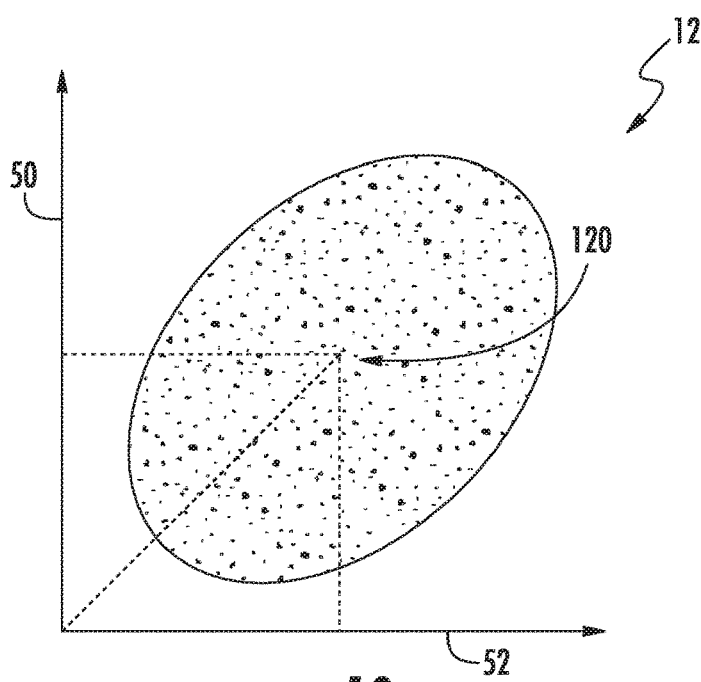
FIG. 10 is a section view of the fiducial marker of FIG. 9 at a second time in accordance with embodiments of the present disclosure.

Using the centroid of the fiducial markers 12 as the reference point for distance measurement may advantageously reduce or minimize error due to deformation of the markers 12. For example, FIG. 9 illustrates an exemplary fiducial marker 12 in an initial condition, e.g., as manufactured, and FIG. 10 illustrates the fiducial marker 12 of FIG. 9 in a subsequent condition, e.g., after the component 10 on which marker 12 is situated has been subjected to at least one duty cycle. In this example, the distance between a point on the edge of marker 12 and another point on an adjacent marker may change merely because the shape of marker 12 changed such that points along the edge or circumference of marker 12 are displaced due to deformation of marker 12 instead of or in addition to any deformation of the component 10. In contrast, the location of the centroid 120 remains relatively constant as compared to the location of points along the edge of the marker 12, and as such a truer picture of the deformation of the component 10 may be obtained by defining the location of each marker 12, and the distances between markers, based on the centroid(s) 120. In FIGS. 9 and 10, the location of centroid 120 is defined in a coordinate system with reference to mutually orthogonal axes 50, 52, which may be any two of the X-axis, Y-axis or Z-axis, as described below and illustrated in FIG. 6. In further exemplary embodiments, the location of centroid 120 may be defined in a three-dimensional coordinate system with reference to all three of the X-axis, Y-axis and Z-axis.

Figure 8:
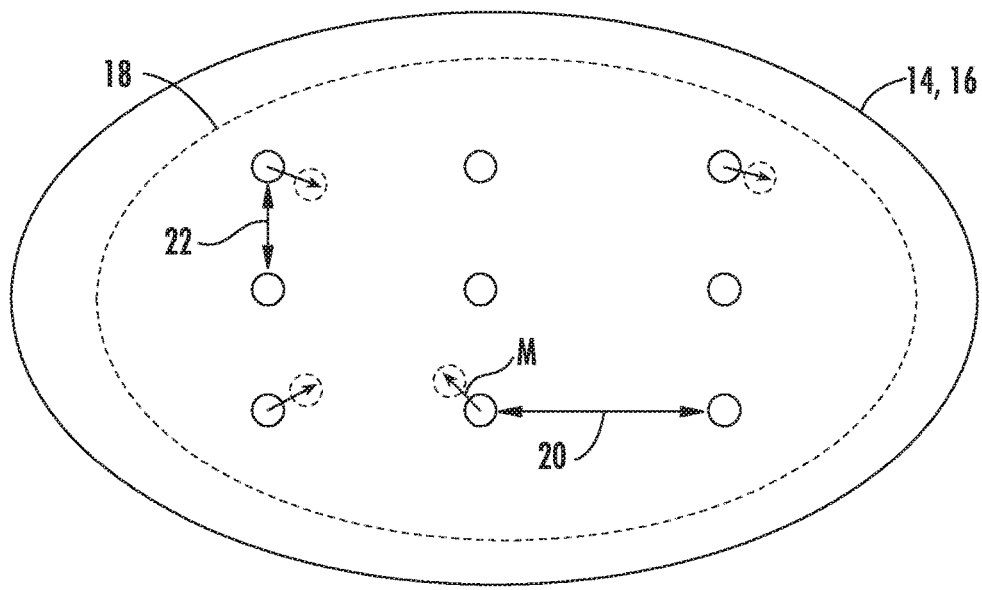
FIG. 8 is an overhead view of a plurality of fiducial markers in accordance with embodiments of the present disclosure.

Referring now to FIGS. 1 through 8, an exemplary embodiment of a system for monitoring component deformation is illustrated. Such systems in accordance with the present disclosure may facilitate improved local and/or global strain analysis by measuring fiducial markers 12 along three axes (conventionally termed as an X-axis, Y-axis and Z-axis and which are mutually orthogonal). Movements M (FIG. 8) of the fiducial markers 12 may be tracked in each plane as the system 23 measures the relative displacement of each marker, and thereby the deformation of the component 10, as illustrated in FIG. 8. The system 23 may include, for example, a plurality of fiducial markers 12 which are positioned on the outer surface 14 of one or more components as discussed above. Further, system 23 may include a three-dimensional data acquisition device 24, such as in exemplary embodiments an optical scanner 24 (FIG. 6) for analyzing the fiducial markers 12, and a processor 26 in operative communication with the three-dimensional data acquisition device.

In general, as used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 26 may also include various input/output channels for receiving inputs from and sending control signals to various other components with which the processor 26 is in communication, such as the three-dimensional data acquisition device 24. The processor 26 may further include suitable hardware and/or software for storing and analyzing inputs and data from the three-dimensional data acquisition device 24, and for generally performing method steps as described herein.

Notably, processor 26 (or components thereof) may be integrated within the three-dimensional data acquisition device 24. In additional or alternative embodiments, the processor 26 (or components thereof) may be separate from the three-dimensional data acquisition device 24. In exemplary embodiments, for example, processor 26 includes components that are integrated within the three-dimensional data acquisition device 24 for initially processing data received by the three-dimensional data acquisition device 24, and components that are separate from the three-dimensional data acquisition device 24 for measuring the fiducial markers 12 and/or assembling contemporary three-dimensional profiles from the data and comparing these profiles.

In general, processor 26 is operable for directly measuring the fiducial markers 12 along an X-axis, a Y-axis and a Z-axis to obtain X-axis data points, Y-axis data points, and Z-axis data points and create accurate 3D digital replications of the topology of surface 14. As discussed, the axes are mutually orthogonal. The X-axis data points, Y-axis data points, and Z-axis data points are dimensional data points related to the direct measurement of the fiducial markers 12. Processor 26 may further be operable for locating a centroid 120 of each fiducial marker 12, e.g., determining three-dimensional coordinates representing the location of the centroid 120. By scanning the component 10 at various times, e.g., before and after deformation events such as creep, fatigue, and overloads, the component 10 may be monitored for, e.g. stress and/or strain. The three-dimensional data acquisition device 24 may be operable to perform a single three-dimensional scan of the component 10 such that a composite scan is not required or performed. The single three-dimensional scan of the component 10 produces three-dimensional data and permits three-dimensional strain analysis. Exemplary embodiments of such three-dimensional data may include polygon mesh data within three-dimensional point clouds, including centroid coordinates in a three-dimensional space defined by the mutually orthogonal axes X, Y, and Z. Such three-dimensional data may then be input to deformation analysis algorithms to calculate regional surface strain.

In general, any suitable three-dimensional data acquisition device 24 which utilizes surface metrology techniques to obtain direct measurements in three dimensions may be utilized. In exemplary embodiments, device 24 is a non-contact device which utilizes non-contact surface metrology techniques. Further, in exemplary embodiments, a device 24 in accordance with the present disclosure has a resolution along the X-axis, the Y-axis and the Z-axis of between approximately 100 nanometers and approximately 100 micrometers. Accordingly, and in accordance with exemplary methods, the X-axis data points, Y-axis data points, and Z-axis data points are obtained at resolutions of between approximately 100 nanometers and approximately 100 micrometers.

For example, in some embodiments, suitable optical scanners 24 which optically identify fiducial markers 12 in three dimensions may be utilized. FIG. 6 illustrates an exemplary embodiment of an optical scanner 24 in accordance with the present disclosure, wherein the scanner is a structured light scanner. Structured light scanners generally emit light 28 from included emitter such as light-emitting diodes 30 or other suitable light generating apparatus. In exemplary embodiments, the emitted light 28 utilized by a structured light scanner is blue light or white light. In general, the emitted light 28 is projected onto the fiducial markers 12 and component 10 generally in a particular pattern. When the light 28 contacts the fiducial markers 12 and component 10, the surface contour of the component and fiducial markers 12 distorts the light 28. This distortion may be captured by a detector after the structured light is reflected by the outer surface, e.g., in an image taken by a camera 32. The image of the light 28 contacting the fiducial markers 12 (and surrounding outer surface 14) is received by, for example, the processor 26. The processor 26 then calculates X-axis data points, Y-axis data points, and Z-axis data points based on the received images by, for example, comparing the distortions in the light pattern to the expected pattern. Notably, in exemplary embodiments the processor 26 operates such optical scanners 24 to perform various above disclosed steps.

Alternatively, other suitable data acquisition devices may be utilized. For example, in some embodiments, device 24 is a laser scanner. Laser scanners generally include lasers which emit light in the form of laser beams towards objects, such as in these embodiments fiducial markers 12 and turbine components 10 generally. The light is then detected by a sensor of the device 24. For example, in some embodiments, the light is then reflected off of surfaces which it contacts, and received by a sensor of the device 24. The round-trip time for the light to reach the sensor is utilized to determine measurements along the various axes. These devices are typically known as time-of-flight devices. In other embodiments, the sensor detects the light on the surface which it contacts, and determines measurements based on the relative location of the light in the field-of-view of the sensor. These devices are typically known as triangulation devices. X-axis, Y-axis and Z-axis data points are then calculated based on the detected light, as mentioned. Notably, in exemplary embodiments processor 26 performs and operates such data acquisition devices 24 to perform various above disclosed steps.

In some embodiments, the light emitted by a laser is emitted in a band which is only wide enough to reflect off a portion of object to be measured, such as the plurality of fiducial markers 12. In these embodiments, a stepper motor or other suitable mechanism for moving the laser may be utilized to move the laser and the emitted band as required until light has been reflected off of the entire object to be measured.

Still further, other suitable three-dimensional data acquisition devices 24 may be utilized. Alternatively, however, the present disclosure is not limited to the use of three-dimensional data acquisition devices 24. For example, other suitable devices include electrical field scanners, which may include for example an eddy current coil, a Hall Effect probe, a conductivity probe, and/or a capacitance probe.

Referring now to FIG. 11, an exemplary method 200 of forming a passive strain indicator on a preexisting component 10 is illustrated. The preexisting component 10 includes an outer surface 14 of a first material. The method 200 includes directly depositing a plurality of fiducial markers 12 on a portion 18 of the outer surface 14 of the preexisting component 10. The method 200 includes the step 210 of directing a flow of a carrier fluid towards a first location on the outer surface 14 of the preexisting component 10, the flow of carrier fluid carrying a powder, the powder comprising a second material that is compatible with the first material. The method 200 also includes the step 220 of emitting light in the form of laser beams from a laser source. The method 200 also includes the step 230 of directing the emitted laser beams towards the first location on the outer surface of the component to melt the powder carried in the flow of the carrier fluid onto the outer surface of the component at the first location, whereby a first fiducial marker 12 is formed from the second material at the first location.

Still with reference to method 200 in FIG. 11, the method further includes step 240 of directing the flow of carrier fluid towards a second location on the outer surface of the preexisting component and the step 250 of directing the emitted laser beams towards the second location on the outer surface of the preexisting component to melt the powder carried in the flow of the carrier fluid onto the outer surface of the component at the second location, whereby a second fiducial marker 12 is formed of the second material at the second location. The portion of the outer surface defines an analysis region 18 on the outer surface 14 of the component 10. The analysis region 18 defines a gage length G, and each fiducial marker 12 of the plurality of fiducial markers has a maximum diameter MD of between one-tenth and one-twentieth of the gage length G. The steps of method 200, e.g., steps 210 through 230, may be reiterated as desired to form additional fiducial markers 12.

Figure 12:
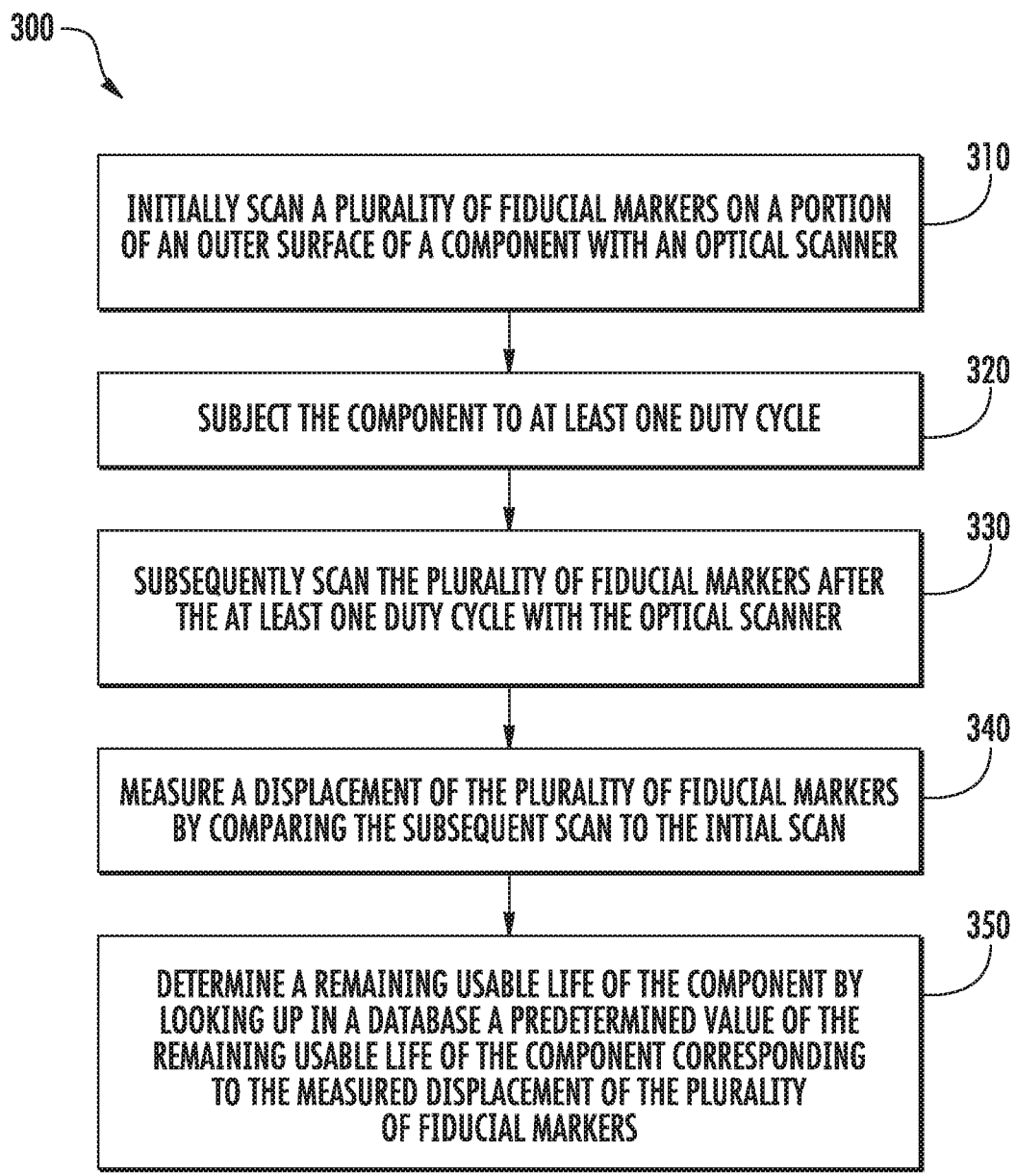
FIG. 12 is a flow chart illustrating a method for evaluating component deformation in accordance with one or more embodiments of the present disclosure.

Referring now to FIG. 12, an exemplary method 300 of evaluating a component is illustrated. Such methods 300 in exemplary embodiments may, in whole or in part, be performed by processors 26 as discussed herein. Method 300 includes the step 310 of initially measuring a plurality of fiducial markers 12 on a portion 18 of an outer surface 14 of a component 10 with a three-dimensional data acquisition device 24, such as by scanning the plurality of fiducial markers 12 with an optical scanner. Such step may occur at a first time. Method 300 further includes the step 320 of subjecting the component 10 to at least one duty cycle, which may occur after the first time. For example, the duty cycle may occur for turbine components as use in service in a turbomachine or other operation. Alternatively, the duty cycle may generally be accomplished through use of the component 10 in the environment for which the component 10 was designed to be utilized. Method 300 further includes the step 330 of subsequently measuring the plurality of fiducial markers 12 after the at least one duty cycle (and at a second time after the first time), such as directly measuring with a three-dimensional data acquisition device 24. Method 300 further includes the step 340 of measuring a displacement of the plurality of fiducial markers by comparing the subsequent scan to the initial scan. Method 300 further includes the step 350 of determining a remaining usable life of the component by looking up in a database a predetermined value of the remaining usable life of the component corresponding to the measured displacement of the plurality of fiducial markers.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of forming a passive strain indicator on a preexisting turbine component, the preexisting turbine component comprising an outer surface comprising a first material, the method comprising:
    directing a flow of a carrier fluid towards a portion of the outer surface of the preexisting turbine component, the flow of carrier fluid carrying a powder, the powder comprising a second material that is different from and compatible with the first material;
    emitting light in the form of a laser beam from a laser source;
    directing the emitted laser beam towards the portion of the outer surface of the preexisting turbine component to melt the powder carried in the flow of the carrier fluid onto the outer surface of the preexisting turbine component at a first location within the portion of the outer surface of the preexisting turbine component, whereby a first fiducial marker of the passive strain indicator is formed at the first location;
    directing the flow of carrier fluid towards a second location within the portion of the outer surface of the preexisting turbine component; and
    directing the emitted laser beam towards the second location on the outer surface of the preexisting turbine component to melt the powder carried in the flow of the carrier fluid onto the outer surface of the component at the second location, whereby a second fiducial marker of the passive strain indicator is formed at the second location;
    wherein the portion of the outer surface comprises an analysis region on the outer surface of the preexisting turbine component, the analysis region defines a gage length, and each of the first fiducial marker and the second fiducial marker has a maximum diameter of between one-tenth and one-twentieth of the gage length.

2. The method of claim 1, wherein the first fiducial marker and the second fiducial marker are formed on the preexisting turbine component while the preexisting turbine component is in a service position.

3. The method of claim 1, wherein the first location on the outer surface and the second location on the outer surface are spaced apart such that the method further comprises leaving bare portions of the outer surface between and around the first fiducial marker and the second fiducial marker.

4. The method of claim 1, wherein the first material is a superalloy and the second material is a different superalloy.

5. The method of claim 1, wherein the first material is a nickel-based superalloy and the second material is a cobalt-based superalloy.

6. A component, comprising:
    an outer surface comprising a first material;
    a plurality of fiducial markers on a portion of the outer surface, the fiducial markers comprising a second material that is different from and compatible with the first material, the portion of the outer surface comprising an analysis region on the outer surface of the component, the analysis region defines a gage length, and each fiducial marker of the plurality of fiducial markers has a maximum diameter of between one-tenth and one-twentieth of the gage length, wherein an area of the analysis region is less than about ten percent of the area of the outer surface.

7. The component of claim 6, wherein the area of the analysis region is less than about eight percent of the area of the outer surface.

8. The component of claim 6, wherein the area of the analysis region is less than about two and a half percent of the area of the outer surface.

9. The component of claim 6, wherein the plurality of fiducial markers are arranged in the analysis region in a matrix grid, the matrix grid having a preselected row spacing and a preselected column spacing.

10. The component of claim 9, wherein one of the preselected row spacing or the preselected column spacing is less than about seventy-five percent of the maximum diameter.

11. The component of claim 9, wherein one of the preselected row spacing or the preselected column spacing is less than about sixty percent of the maximum diameter.

12. The component of claim 6, wherein the first material is a first metallic material and the second material is a second metallic material.

13. The component of claim 6, wherein the component is a gas turbine component.

14. The component of claim 6, wherein the component is a hot gas path component of a gas turbine.

15. The component of claim 6, wherein the analysis region includes a life-limiting region of the component.

* * * * *